US011817592B2

(12) United States Patent
Uchiyama et al.

(10) Patent No.: US 11,817,592 B2
(45) Date of Patent: Nov. 14, 2023

(54) BATTERY HOLDER AND ELECTRONIC DEVICE

(71) Applicant: NIHON KOHDEN CORPORATION, Tokyo (JP)

(72) Inventors: Yutaka Uchiyama, Tokorozawa (JP); Kiyohiro Omori, Tokorozawa (JP)

(73) Assignee: NIHON KOHDEN CORPORATION, Tokyo (JP)

( * ) Notice: Subject to any disclaimer, the term of this patent is extended or adjusted under 35 U.S.C. 154(b) by 171 days.

(21) Appl. No.: 16/613,918

(22) PCT Filed: May 14, 2018

(86) PCT No.: PCT/JP2018/018587
§ 371 (c)(1),
(2) Date: Nov. 15, 2019

(87) PCT Pub. No.: WO2018/212137
PCT Pub. Date: Nov. 22, 2018

(65) Prior Publication Data
US 2020/0161608 A1    May 21, 2020

(30) Foreign Application Priority Data

May 18, 2017 (JP) ................................. 2017-099087

(51) Int. Cl.
*H01M 50/502* (2021.01)
*H01M 50/296* (2021.01)
(Continued)

(52) U.S. Cl.
CPC ....... *H01M 50/213* (2021.01); *H01M 50/227* (2021.01); *H01M 50/296* (2021.01); *H01M 50/502* (2021.01); *H01M 2220/30* (2013.01)

(58) Field of Classification Search
CPC . H01M 10/213; H01M 50/20; H01M 2220/30
See application file for complete search history.

(56) References Cited

U.S. PATENT DOCUMENTS

| | | |
|---|---|---|
| 5,192,904 A | 3/1993 | Leiserson |
| 5,225,760 A | 7/1993 | Leiserson |
| (Continued) | | |

FOREIGN PATENT DOCUMENTS

| | | |
|---|---|---|
| JP | H05-251068 A | 9/1993 |
| JP | H07-037563 A | 2/1995 |
| | (Continued) | |

OTHER PUBLICATIONS

Japanese Office Action dated Jan. 26, 2021 issued in Japanese Patent Application No. 2017-099087.
(Continued)

*Primary Examiner* — Maria Laios
*Assistant Examiner* — Jordan E Berresford
(74) *Attorney, Agent, or Firm* — Pearne & Gordon LLP

(57) ABSTRACT

A battery holder is to be stored in a storage part of an electronic device and to be integrated with a casing of the electronic device. The battery holder includes a case in which a battery is to be stored, and an electric connection part provided in the case. The electric connection part is electrically connected to an electrode of a stored battery and is electrically connected to the power supply terminal, when the battery holder is stored in the storage part of the electronic device.

13 Claims, 10 Drawing Sheets

(51) Int. Cl.
    *H01M 50/213*    (2021.01)
    *H01M 50/227*    (2021.01)

(56) References Cited

U.S. PATENT DOCUMENTS

| | | |
|---|---|---|
| 5,260,636 A | 11/1993 | Leiserson et al. |
| 5,426,358 A | 1/1995 | Leiserson |
| 5,506,488 A | 4/1996 | Leiserson |
| 5,608,303 A | 3/1997 | Leiserson |
| 2009/0267560 A1 | 10/2009 | Toya et al. |
| 2012/0276791 A1* | 11/2012 | Boetto .............. H01R 13/2464 |
| | | 439/884 |

FOREIGN PATENT DOCUMENTS

| | | | |
|---|---|---|---|
| JP | 2003-317680 A | | 11/2003 |
| JP | 2005-093363 A | | 4/2005 |
| JP | 2006190504 A | * | 7/2006 |
| JP | 2009-266597 A | | 11/2009 |
| JP | 2014-049227 A | | 3/2014 |
| JP | 2014049227 A | * | 3/2014 |

OTHER PUBLICATIONS

International Search Report Issued in Patent Application No. PCT/JP2018/018587 dated Jul. 13, 2018.
Written Opinion Issued in Patent Application No. PCT/JP2018/018587 dated Jul. 13, 2018.
Japanese Office Action dated Aug. 17, 2021 issued in Patent Application No. 2017-099087.

\* cited by examiner

[FIG.1]
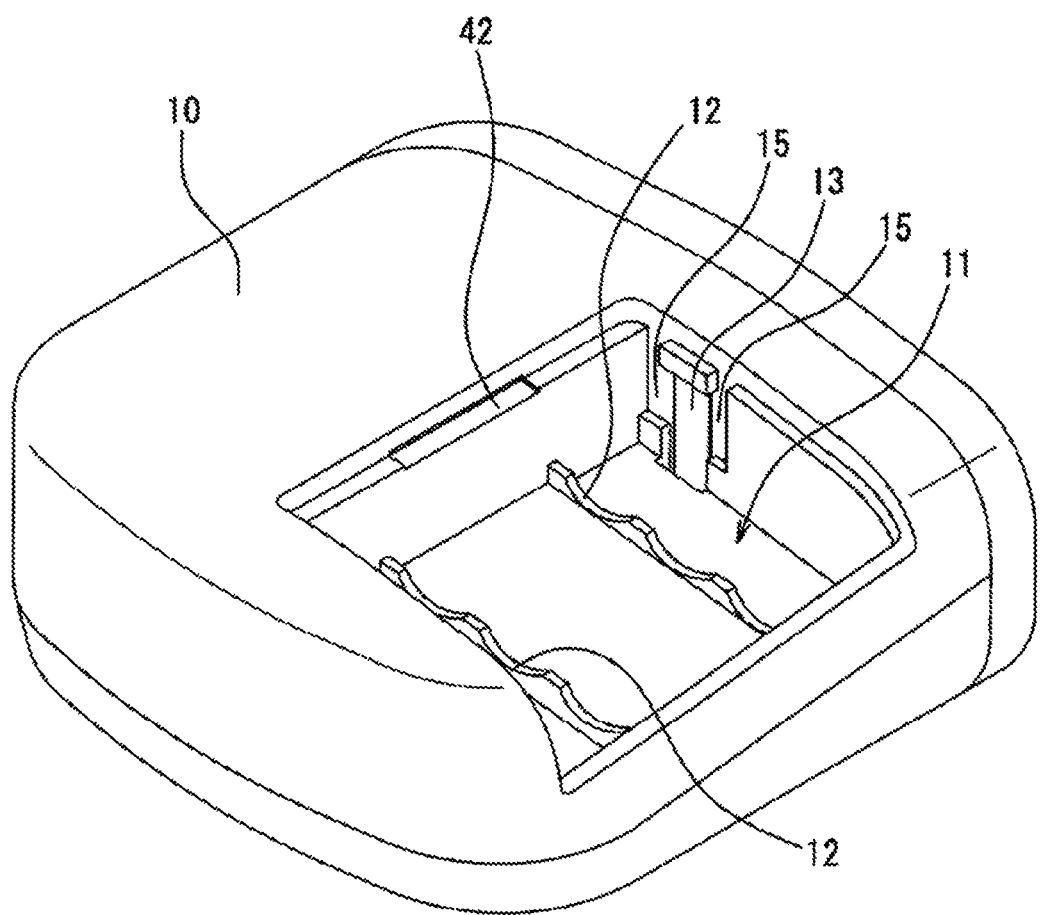

[FIG.2]
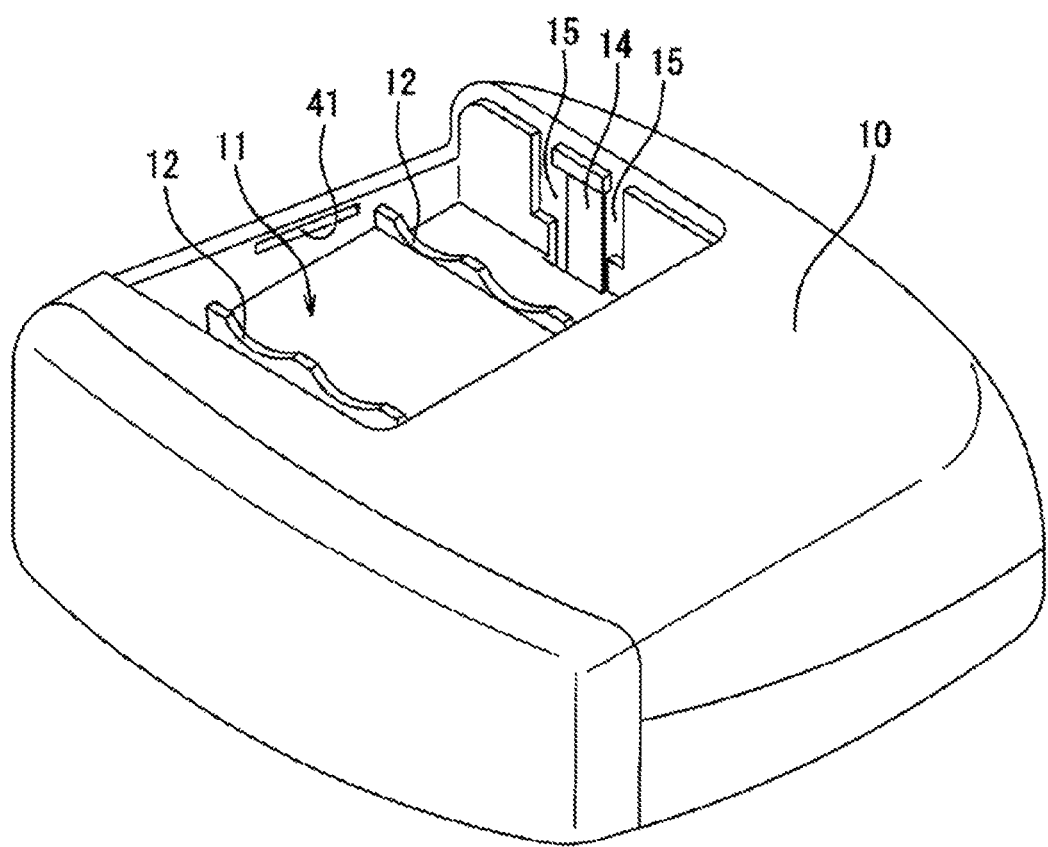

[FIG.3]
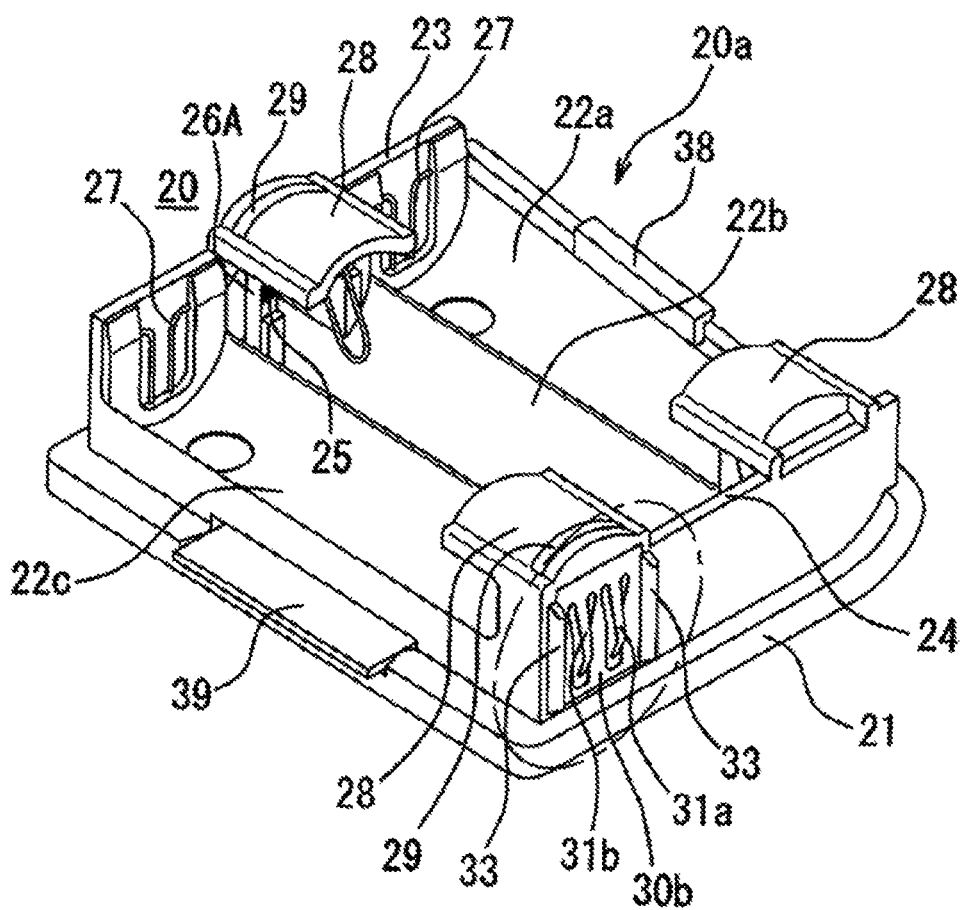

[FIG.4]
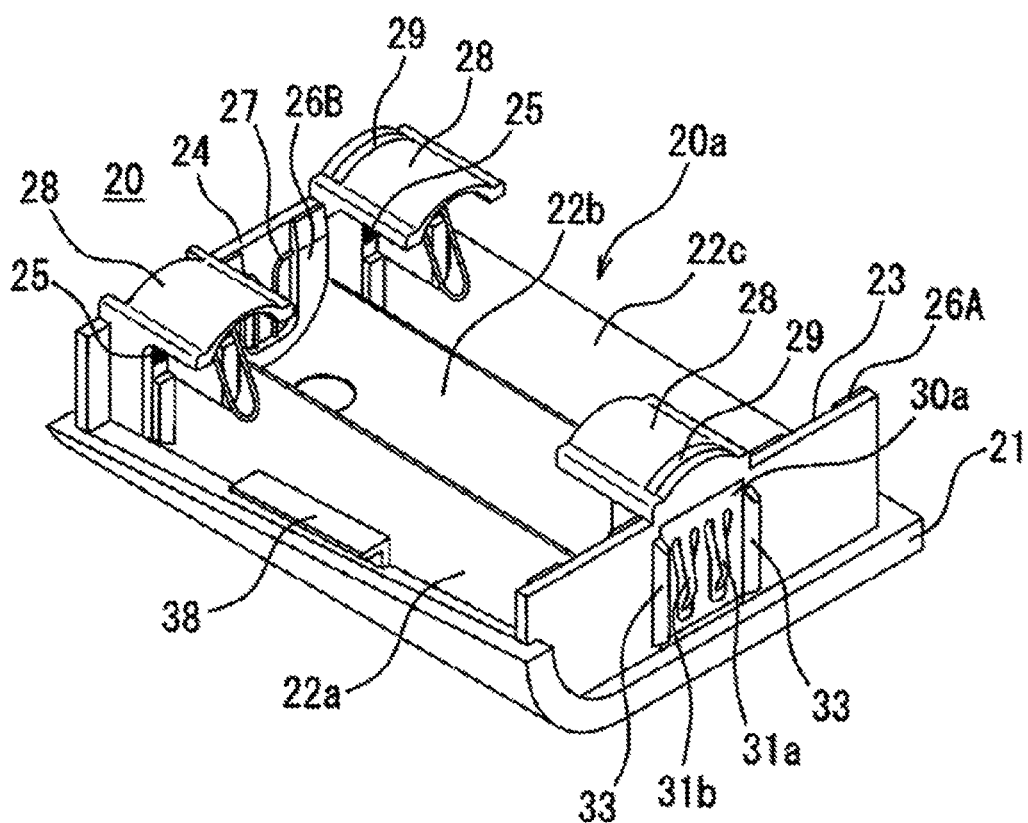

[FIG.5]
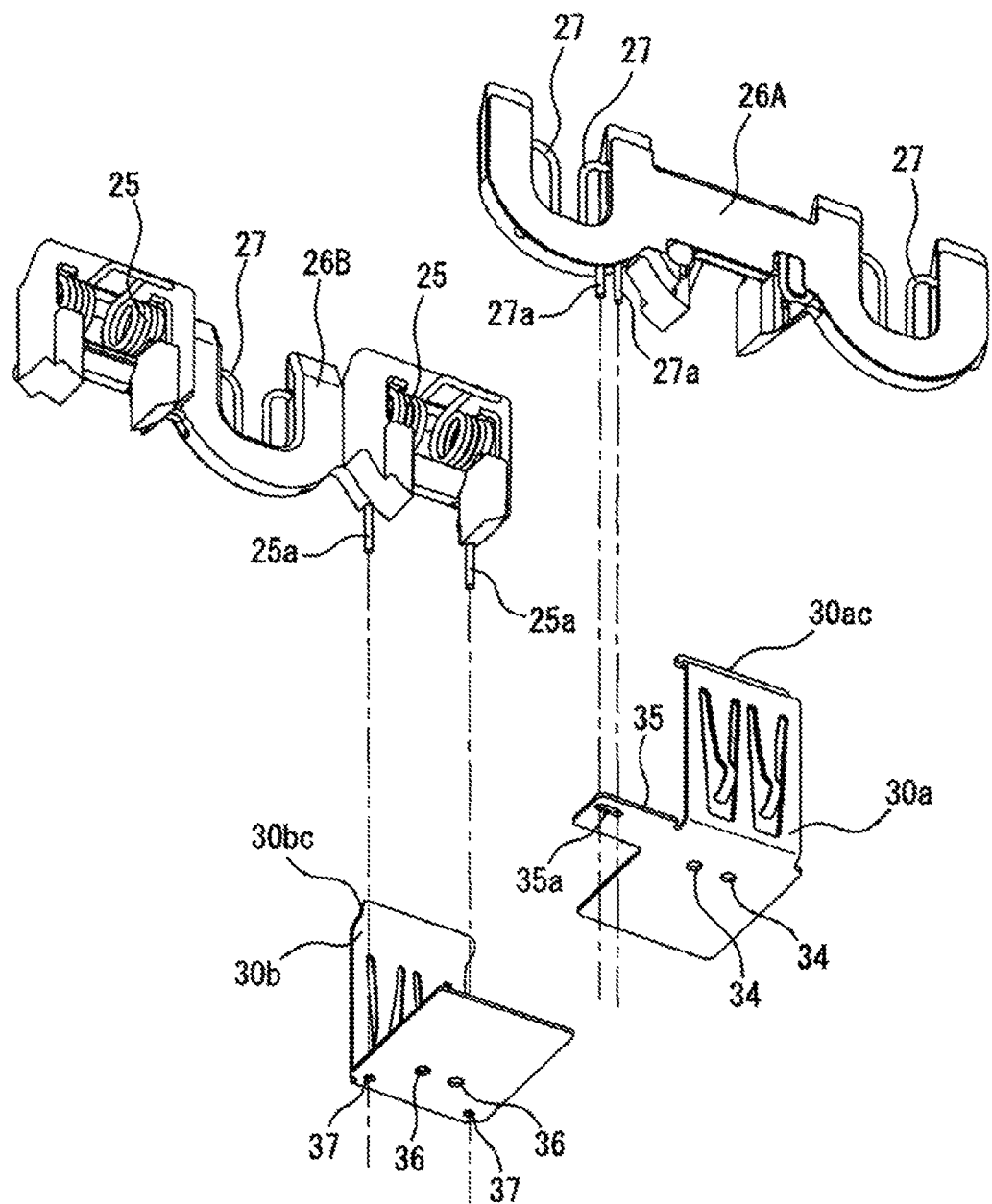

[FIG.6]
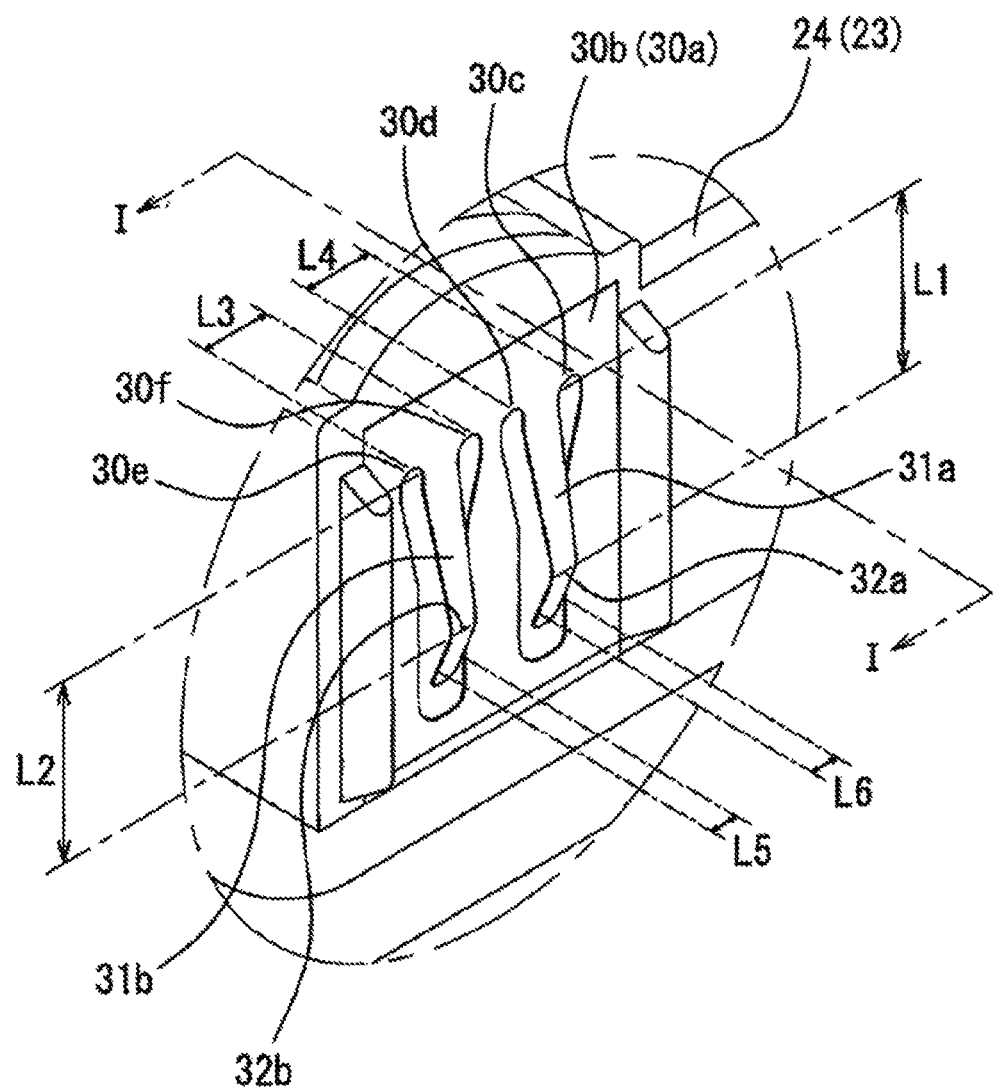

[FIG.7]
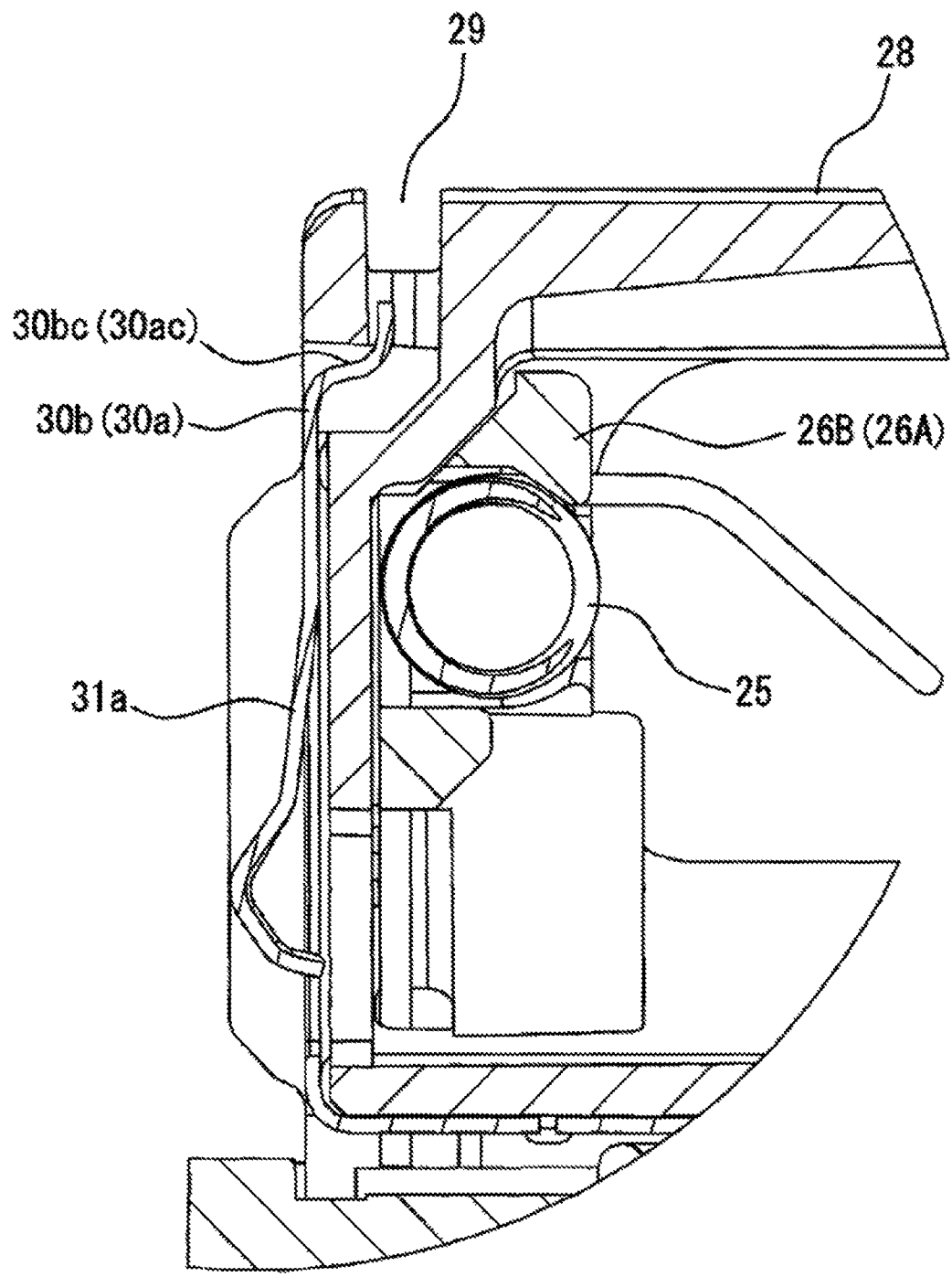

[FIG.8]
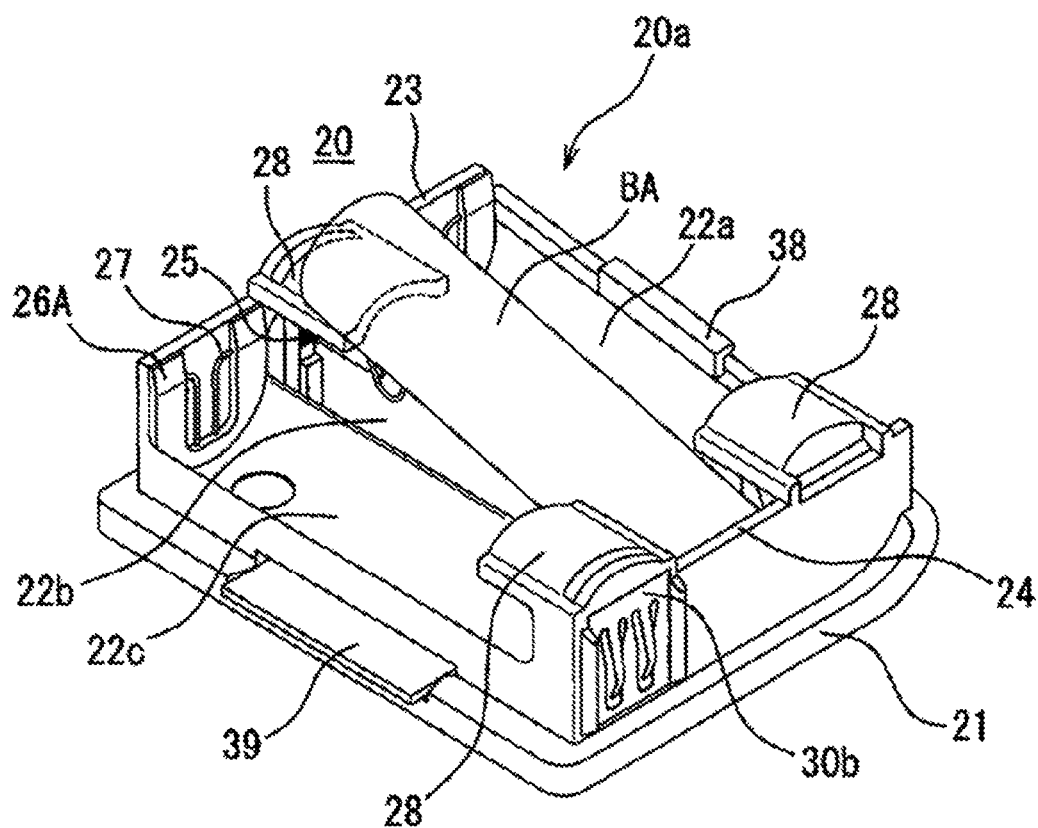

[FIG.9]
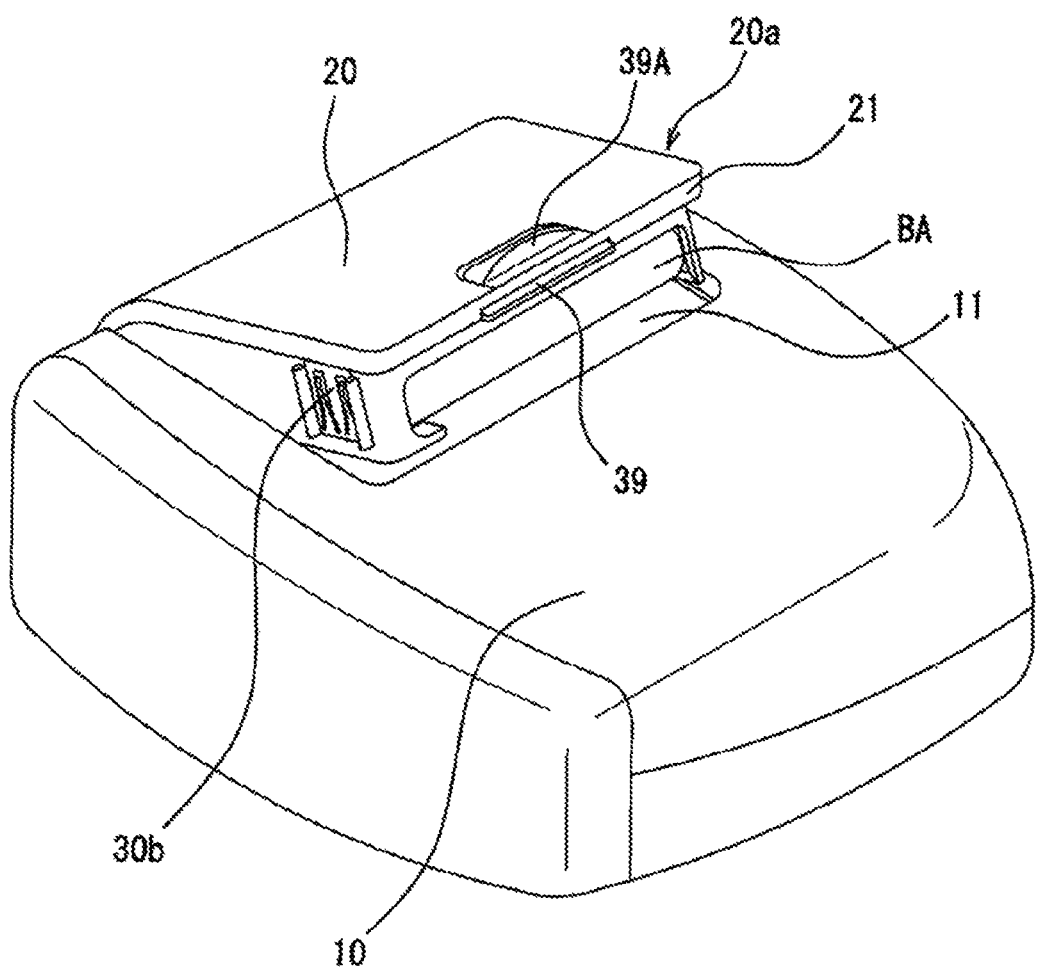

[FIG.10]
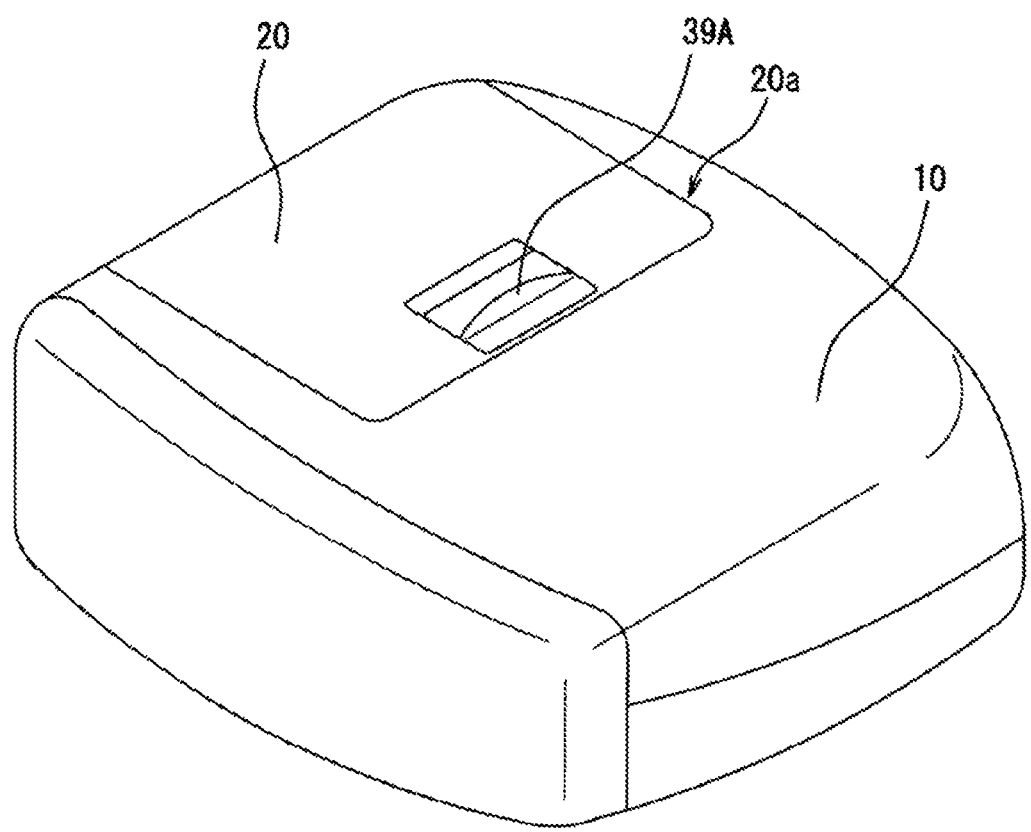

BATTERY HOLDER AND ELECTRONIC DEVICE

TECHNICAL FIELD

The present invention relates to a battery holder in which several number of batteries can be put together so as to be set to a power source part of an electronic device in one touch as a power source of a prescribed voltage. The present invention also relates to the electronic device in which the battery holder is attached to the power source part.

BACKGROUND ART

In a related art electronic device, a power source part for obtaining an electric power is provided in a part of a casing of the electronic device as a battery storage part where a battery is stored. For instance, a space in a part of the casing having a volume to store the battery is used as the battery storage part. In the battery storage part, an electrically conductive terminal plate is embedded which comes into contact with an anode and a cathode of the battery so that the electric power is supplied to a power circuit of the electronic device from the terminal plate. After the battery is stored in the battery storage part, an opening part of the battery storage part is closed by a cover so that the battery is fixed to a prescribed position for preventing situations in which the battery comes into imperfect contact with the terminal plate.

In the structure of the battery storage part of the above-described electronic device, the closing operation of the cover of the battery storage part needs to be carried out separately from a setting operation of the battery, which is troublesome. Further, it is necessary to prevent the battery from popping out. Thus, the operation may be sometimes difficult. Further, depending on the size or form of the electronic device, an operator would need to change the battery under a state that the operator holds the electronic device by one hand, so that an exchanging operation is difficult. Further, since the terminal plate which comes into contact with the anode and the cathode of the battery is embedded in the casing of the electronic device, when the terminal plate needs to be changed due to a deterioration or a breakage caused by a corrosion, the terminal plate cannot be merely changed, and, for instance, the casing itself of the electronic device needs to be changed. Thus, a problem arises that a repair is large-scaled and a cost of the repair is high.

As compared with the above-described structure, JP-A-07-037563 discloses a battery pack in which a plurality of batteries are stored and an electrode to obtain an electric connection with an external part is provided. When this battery pack is used for an electronic device, this battery pack can be extremely conveniently treated as a device separate from the electronic device.

In the battery pack of JP-A-07-037563, the battery is held between an insulator plate having a connection conductor connected to a cathode of the battery and a connection conductor connected to an anode of the battery to obtain an electric connection by the connection conductors. The electrode for obtaining the electric connection with the external part is provided in an attachment plate separate from the insulator plates. Namely, a problem arises that a separate component is used in which the electrode for obtaining the electric connection with the external part is arranged, so that a structure is complicated and a cost is high.

In order to fix the batteries, the plurality of batteries are provided on the attachment plate and held between the two insulator plates. Further, the battery pack is formed in such a way that an entire part is covered and enclosed with a fixing member having a configuration as if a substantially parallelepiped shaped vessel were inverted. As described above, the battery pack has a structure that the fixing member is used which covers the entire part to fix the batteries and semi-permanently pack the batteries by a thermal shrinkage tube and a large and special member is used to fix the batteries.

SUMMARY

Illustrative aspects of the present invention provide a battery holder which has a simple structure and a low cost and which is handled as a device separate from an electronic device.

Further, illustrative aspects of the present invention provide a battery holder where the stored battery is sufficiently fixed while the battery can be easily removed and changed without semi-permanently confining the battery. In addition, illustrative aspects of the present invention provide an electronic device in which the battery holder is integrated with a casing.

According to illustrative aspects, a battery holder is configured to be stored in a storage part of an electronic device and to be integrated with a casing of the electronic device. The storage part includes a power supply terminal for obtaining an electric power. The battery holder includes a case in which a battery is to be stored, and an electric connection part provided in the case. The electric connection part is electrically connected to an electrode of a stored battery and is electrically connected to the power supply terminal, under a state that the battery holder is stored in the storage part of the electronic device.

BRIEF DESCRIPTION OF THE DRAWINGS

FIG. 1 is a perspective view illustrating a storage part of an electronic device according to an exemplary embodiment.

FIG. 2 is a perspective view illustrating the storage part of the electronic device according to the exemplary embodiment which is seen from an opposite direction to that of FIG. 1.

FIG. 3 is a perspective view of an inside of a battery holder according to an exemplary embodiment.

FIG. 4 is a perspective view of the inside of the battery holder according to the exemplary embodiment which is seen from an opposite direction to that of FIG. 3.

FIG. 5 is a perspective view illustrating selected main parts of the battery holder according to the exemplary embodiment.

FIG. 6 is an enlarged perspective view of the main parts of the battery holder according to the exemplary embodiment.

FIG. 7 is a sectional view taken along a line I-I in FIG. 6.

FIG. 8 is a perspective view illustrating an operation of the battery holder according to the exemplary embodiment.

FIG. 9 is a perspective view illustrating a process that the battery holder according to the exemplary embodiment is stored in the storage part of the electronic device.

FIG. 10 is a perspective view illustrating a state that the battery holder according to the exemplary embodiment is stored in the storage part of the electronic device.

DESCRIPTION OF EMBODIMENTS

By referring to the attached drawings, a battery holder and an electronic device of exemplary embodiments will be described below. In the drawings respectively, the same component elements are designated by the same reference numerals to omit a duplicated explanation. An electronic device according to the exemplary embodiment can be set as medical equipment, for instance, a portable type electrocardiograph. As shown in FIG. 1 and FIG. 10, a casing 10 has substantially a rectangular parallelepiped form. Corner parts or sides thereof are respectively chamfered to be round. The casing 10 may have such a size as to be held by one hand of an adult man under a state shown in FIG. 1 or FIG. 2.

In the casing 10, a storage part 11 in which a battery holder 20 shown in FIGS. 3 and 4 is stored is provided. On a bottom surface of the storage part 11, two support members in the form of circular arc shaped receiving ribs 12 are provided in parallel which partly come into contact with and hold side surfaces of batteries set in the battery holder 20.

In side walls of the storage part 11, power supply terminals 13 and 14 are provided for the electronic device to obtain an electric power. The power supply terminal 13 is an electric conductor such as metal and provided at a position opposed to a cathode of the battery located in an innermost side. In the present exemplary embodiment, three batteries are set in parallel in the battery holder 20. At a position opposed to come into contact with a cathode of the battery located at a center of the storage part 11, the power supply terminal 14 is provided. The power supply terminal 14 is formed with an electric conductor such as metal like the power supply terminal 13.

The battery holder 20 is formed with a case 20a made of an insulating resin. A bottom plate 21 of the case 20a corresponds to a cover to an opening part of the storage part 11 formed in the casing 10. Accordingly, one side of the bottom plate 21 is curved upward in the drawing by a chamfering work. In an inner side of the bottom plate 21, three recessed parts 22a to 22c similar to one part of inner walls of cylinders are formed in parallel correspondingly to the forms of side walls of the batteries.

From one end edge of the recessed parts 22a to 22c in a longitudinal direction, an electrode support wall 23 which supports an electrode terminal connected to the anode or the cathode of the battery is provided upward in a direction at right angles to the bottom plate 21. From the other end edge of the recessed parts 22a to 22c in the longitudinal direction, an electrode support wall 24 which is opposed to the electrode support wall 23 to support an electrode terminal connected to the anode or the cathode of the battery is provided. Height dimensions of the electrode support walls 23 and 24 may be set to dimensions a little longer than a diameter of the cylindrical battery.

In a central area of three areas formed by equally dividing the inner side wall of the electrode support wall 23 transversely into three, the electrode terminal 25 which is connected to the cathode of the battery is provided. As shown in FIG. 5, both end sides of the electrode terminal 25 in a transverse direction are formed with an electrically conductive coil spring and held by an electrode holding piece 26A made of the resin of the same material as that of the case 20a. Between the two coil springs, an elastic member in the form of a U-shaped spring wire rod is provided which protrudes slightly downward in the direction of the stored battery. The spring wire rod protruding in the shape of U is the same member as and formed integrally with the spring wire rod of the two coil springs.

In both sides of the central area of the three areas formed by equally dividing the inner side surface of the electrode support wall 23 transversely into three, the electrode terminals 27 are provided which are connected to the anodes of the batteries. The electrode terminal 27 can be formed with the same spring wire rod as that of the electrode terminal 25 under a state that the electrode terminal 27 is held by the electrode holding piece 26A. The form of the electrode terminal 27 is not especially limited. Here, the electrode terminal 27 may be formed in such a way that a lower part of a U-shape is provided in the electrode holding piece 26A, from a left upper end part of the U-shape, the spring wire rod may continuously extend to a left side, and from a right upper end part of the U-shape, the spring wire rod may continuously extends to a right side.

In a central area of three areas formed by equally dividing the inner side surface of the electrode support wall 24 into three in a transverse direction, the electrode terminal 27 connected to the anode of the battery is provided. In both sides of the three areas formed by equally dividing the inner side surface of the electrode support wall 24 into three in the transverse direction, the electrode terminals 25 connected to the cathodes of the batteries are provided. The electrode terminal 27 and the electrode terminals 25 are provided in an electrode holding piece 26B and spring wire rods forming the electrode terminal 27 and the electrode terminal 25 are partly provided in the electrode holding piece 26B.

From the part of the electrode support wall 23 of the case 20a in which the cathode of the battery in a stored state is located, a roof part 28 having a prescribed dimension is formed toward a direction of the anode of the battery so as to cover a cathode side of the battery and not cover an anode side of the battery. Further, from the part of the electrode support wall 24 of the case 20a in which the cathode of the battery in a stored state is located, a roof part 28 having a prescribed dimension is formed toward a direction of the anode of the battery so as to cover a cathode side of the battery and not cover an anode side of the battery.

In the case 20a shown in FIG. 3, as for the three recessed parts 22a to 22c formed in parallel, the recessed part 22 in the right side in the drawing is referred to as a recessed part 22a of a first lane, the recessed part in the center is referred to as a recessed part 22b of a second lane and the recessed part of the left side is referred to as a recessed part 22c of a third lane. In an outer side of the electrode support wall 23 of the recessed part 22b of the second lane, a conductor plate terminal 30a is provided. In an outer side of the electrode support wall 24 of the recessed part 22c of the third lane, a conductor plate terminal 30b is provided. The conductor plate terminals 30a and 30b are conductor plate terminals basically having the same structure and bent in the shape of L as shown in FIG. 5.

In upright parts of the conductor plate terminals 30a and 30b, a plurality (here, two) of contact members 31a and 31b which are energized to the outer side of the case 20a to come into contact with the power supply terminals 13 and 14 are formed. The contact members 31a and 31b are formed in the configurations of tongue shaped pieces by punching them from the conductor plate terminals 30a and 30b.

The contact members 31a and 31b are formed in such a manner that their configurations are respectively different. Specifically, the contact members may be formed so as to have dimensions in which spring constants of the contact members 31a and 31b are changed. For instance, as shown in FIG. 6, the contact members include protruding parts 32a and 32b bent so as to protrude outward in intermediate parts from base parts to tip ends of the tongue shaped pieces and distances L1 and L2 from the base parts to the protruding parts 32a and 32b in the plurality of tongue shaped pieces are respectively different. Otherwise, the contact members may be formed in such a way that angles at which the protruding parts 32a and 32b are energized outward to be bent are different.

Further, the contact members 31a and 31b may be formed in such a way that lengths L3 and L4 of the base parts of the tongue shaped pieces or lengths L5 and L6 in arbitrary positions of the tip end parts from end parts of the tongue shaped pieces are different as shown in FIG. 6.

Further, as shown in FIG. 6, the contact members 31a and 31b may be formed so that punching angles of removed parts 30c, 30d, 30e and 30f located in the vicinity of the base parts of the tongue shaped pieces are different.

In the above-described structure, under a state that the protruding parts 32a and 32b of the contact members 31a and 31b come into contact with the power supply terminals 13 and 14, when the protruding parts 32a and 32b do not come into contact with the power supply terminals 13 and 14 due to a vibration, a phenomenon may be considered that natural frequencies are different in the tongue shaped pieces having the distances L1 and L2, and timings are different at which the two protruding parts 32a and 32b do not come into contact with the power supply terminals. Accordingly, when a shaking is generated due to the vibration, a situation is prevented in which the two protruding parts 32a and 32b do not come into contact with the power supply terminals at the same time and a power source is instantaneously disconnected. Thus, when the electronic device is the medical equipment, troubles can be prevented that an art fact occurs in a measured signal or an operation is unstable.

Further, as shown in FIG. 5, in top parts of the conductor plate terminals 30a and 30b, engaging parts 30ac and 30bc are formed which are bent once inside from the upright parts extending upward, and further directly bent upward at right angles thereto. An assembled structure of the engaging parts 30ac and 30bc with the roof parts 28 is shown in a sectional view in FIG. 7. Namely, the engaging part 30ac serves to be inserted into and engaged with a slit 29 formed in a base part of the roof part 28 of the recessed part 22b of the second lane so as to fix the conductor plate terminal 30a. Further, the engaging part 30bc serves to be inserted into and engaged with a slit 29 formed in a base part of the roof part 28 of the recessed part 22c of the third lane so as to fix the conductor plate terminal 30b.

As described above, the conductor plate terminals 30a and 30b are located at the positions of the electrodes of the batteries stored in the case 20a and provided in the outer side of the case 20a. At positions along both side parts of the conductor plate terminals 30a and 30b provided in the outer side of the case 20a, protrusions 33 are formed.

In the storage part 11 in the casing 10 of the electronic device, groove parts 15 corresponding to the protrusions 33 are formed. Conversely stated, at positions along both the side parts of the conductor plate terminals 30a and 30b, the protrusions 33 are formed which correspond to the groove parts 15 of the storage part 11 in the casing 10 of the electronic device.

In the above-described structure, a stress applied to the contact members 31a and 31b of the battery holder when the case 20a is gripped or the battery holder is attached can be mitigated. When the battery holder 20 is stored in the storage part 11 in the casing 10 of the electronic device, the protrusions 33 formed in the case 20a of the battery holder 20 are engaged with the groove parts 15 of the storage part 11 in the casing 10 of the electronic device. Accordingly, when the vibration arises in the casing 10 of the electronic device, the stress applied to a transverse direction of the contact members 31a and 31b can be mitigated, a deterioration or a breakage of the contact members 31a and 31b can be prevented and an electric connection of the conductor plate terminals 30a and 30b with the power supply terminals 13 and 14 can be anticipated so as to be suitably maintained without a backlash.

As shown in FIG. 5, in a plane part at right angles to the upright part of the conductor plate terminal 30a which is bent in the shape of L, through holes 34 are formed. Through the through holes 34, studs are passed to melt and fix the conductor plate terminal 30a to the case 20a so as to fix the conductor plate terminal 30a to the case 20a. In the plane part of the conductor plate terminal 30a, a connection part 35 is provided which protrudes to the recessed part 22a side of the adjacent first lane. In an end part of the connection part 35, a hole part 35a connected to the spring wire rod is formed.

To the electrode support wall 23 of the case 20a, the electrode holding piece 26A is stuck and fixed. In the electrode holding piece 26A, the electrode terminal 27 is provided which faces the recessed part 22a of the first lane and is connected to the anode of the battery. An end part 27a of the spring wire rod of the electrode terminal 27 is extended to the hole part 35a formed in the connection part 35 of the conductor plate terminal 30a from the electrode holding piece 26A. The end part 27a of the spring wire rod of the electrode terminal 27 is, for instance, welded to the hole part 35a to achieve an electric connection between them.

The electrode terminal 25 provided in the electrode holding piece 26A facing the recessed part 22b of the second lane is electrically connected to the electrode terminal 27 provided in the electrode holding piece 26A facing the recessed part 22c of the third lane in the electrode holding piece 26A.

In a plane part at right angles to the upright part of the conductor plate terminal 30b which is bent in the shape of L, through holes 36 are formed. Through the through holes 36, studs are passed to melt and fix the conductor plate terminal 30b to the case 20a so as to fix the conductor plate terminal 30b to the case 20a. In the vicinity of the bent part in the plane part of the conductor plate terminal 30b, a hole 37 corresponding to a diameter of the spring wire rod is provided.

To the electrode support wall 24 of the case 20a, the electrode holding piece 26B is stuck and fixed. In the electrode holding piece 26B, the electrode terminal 25 is provided which faces the recessed part 22c of the third lane and is connected to the cathode of the battery. An end part 25a of the spring wire rod of the electrode terminal 25 is extended to the hole 37 formed in the plane part of the conductor plate terminal 30b from the electrode holding piece 26B. The end part 25a of the spring wire rod of the electrode terminal 25 is inserted into the hole 37, and, for instance, welded to make an electric connection.

The electrode terminal 27 provided in the electrode holding piece 26B facing the recessed part 22b of the second lane is electrically connected to the electrode terminal 25 provided in the electrode holding piece 26B facing the recessed part 22c of the third lane in the electrode holding piece 26B.

The above-described electrode terminals 25 and 27 and the conductor plate terminals 30a and 30b form an electric connection part. The electric connection part is provided in the case 20a, electrically connected to the electrodes of the stored batteries and connected to the power supply terminals 13 and 14 under a state that the electric connection part is stored in the storage part 11 of the electronic device. Then, the batteries are connected in series by the three electrode terminals 25 and the three electrode terminals 27. Further, the conductor plate terminal 30a serves as an end part anode of the three batteries connected in series and the conductor plate terminal 30b serves as an end part cathode of the three batteries connected in series.

The conductor plate terminals 30a and 30b are provided in the outer sides of the electrode support walls 23 and 24 of the adjacent lanes. Accordingly, in the case of such a vibration as to rotate on the conductor plate terminal 30b in a transverse direction under a state shown in FIG. 3, an amplitude due to a shaking is smaller when the conductor terminal plate 30a is provided in the outside of the electrode support wall 23 of the adjacent lane than that when the conductor plate terminal 30a is provided in the outside of the electrode support wall 23 of a distant lane. Thus, a connected state between the conductor plate terminal 30a and the power supply terminal 14 can be anticipated to be stably held.

As shown in FIG. 2, in the casing 10 of the electronic device, the storage part 11 is provided. In a side (a first side) nearest to an outer wall of the casing 10 in the opening part of the storage part 11, a rotation receiving part 41 (or a rotation part formed with a protruding shaft) formed with a groove having a prescribed length is configured.

In the case 20a, a rotation part 38 (or a rotation receiving part formed with a groove having a prescribed length) which is formed with a shaft having a prescribed length corresponding to the rotation receiving part 41 (or the rotation part formed with the protruding shaft) of the electronic device shown in FIG. 2 is configured.

In a second side opposed to the first side of the opening part in the electronic device, one mechanism of a fitting mechanism is formed. In the present exemplary embodiment, the one mechanism of the fitting mechanism is formed with a groove 42 having a prescribed length.

In the case 20a, the other mechanism of the fitting mechanism corresponding to the one mechanism of the fitting mechanism is formed. Specifically, the other mechanism is a mechanism formed with a protruding piece 39 allowed to protrude by a spring from an inner part of the bottom plate 21 of the case 20a. In an outer surface side of the bottom plate 21, a lever 39A is provided (FIG. 9) which retracts the protruding piece 39 to the inner side of the bottom plate 21 of the case 20a against the spring.

The electronic device and the battery holder 20 formed as described above can be used in such a manner as described below. Initially, the batteries are stored in the battery holder 20. The batteries are stored in the recessed part 22a of the first lane, the recessed part 22b of the second lane and the recessed part 22c of the third lane. The cathodes of the batteries are inserted into the sides of the roof parts 28 of the respective lanes. At this time, even when the battery is inserted in a hurry to previously insert the anode of the battery to the electrode terminal 27 side, a state shown in FIG. 8 occurs, so that the cathode of the battery BA cannot be pressed by the roof part 28. Accordingly, in a usual battery holder in which roof parts 28 are not provided, when the battery is set by pressing a cathode of the battery, there is a fear that an electrode terminal 25 may be broken. However, in the present exemplary embodiment, a fear can be eliminated that the electrode terminal 25 may be broken.

Further, since the roof par 28 is provided, under a state that the battery is set, a conduct that the battery is pulled out from the electrode terminal 25 side can not be done. Thus, a fear may be eliminated that the battery itself or the electrode terminal 25 is broken.

Since the U-shaped spring wire rod protruding slightly downward in the direction of the battery is provided in the electrode terminal 25 and the length of the roof part 28 in the longitudinal direction of the battery under a state that the battery is stored in the battery holder 20 is located so as to be longer than a position of an end part of the U-shaped spring wire rod, when the anode of the battery is erroneously set to the electrode terminal 25, the anode of the battery is repelled by the spring wire rod and the battery is the caught in the roof part 28. Accordingly, the battery cannot be satisfactorily set, so that the battery can be prevented from being erroneously attached.

All the batteries are set in such a manner as described above, the rotation part 38 formed in the case 20a of the battery holder 20 is inserted into the rotation receiving part 41 formed in the storage part 11 of the electronic device and rotated so as to close the storage part 11 by the battery holder 20 (see FIG. 9). When the opening part is closed, since the protruding piece 39 protrudes, the lever 39A is operated to carry out an operation under a state that the protruding piece 39 is retracted to the inner side of the bottom plate 21 of the case 20a. Thus, the casing 10 of the electronic device and the battery holder 20 are integrated with each other, as shown in FIG. 10.

When the battery holder 20 is taken out to change the battery from the state shown in FIG. 10, under a state that the protruding piece 39 is retracted to the inner side of the bottom plate 21 of the case 20a by operating the lever 39A, the battery holder 20 is pulled out from the storage part 11 to obtain a state shown in FIG. 8. Further, the battery holder 20 is pulled out so that an engaged state of the rotation receiving part 41 formed in the storage part 11 of the electronic device and the rotation part 38 formed in the case 20a of the battery holder 20 is disengaged to take out the battery holder 20. Then, the battery is taken out from the battery holder 20 to change the battery.

In the above-described exemplary embodiment, the rotation receiving part 41 is provided in the storage part 11 of the electronic device and the rotation part 38 is formed in the case 20a. However, a structure may be formed in which these members are exchanged. Further, the mechanism formed with the protruding piece 39, the spring and the lever 39A which are provided in the battery holder 20 may be provided in the electronic device and the mechanism formed with the groove 42 which is provided in the electronic device may be provided in the battery holder 20.

According to embodiments, a battery holder is configured to be stored in a storage part of an electronic device and to be integrated with a casing of the electronic device. The storage part includes a power supply terminal for obtaining an electric power. The battery holder includes a case in which a battery is to be stored, and an electric connection part provided in the case. The electric connection part is electrically connected to an electrode of a stored battery and is electrically connected to the power supply terminal, under a state that the battery holder is stored in the storage part of the electronic device.

According to embodiments, the electric connection part includes a conductor plate terminal. The conductor plate includes a plurality of contact members. The plurality of contact members are energized toward an outer side of the case so as to come into contact with the power supply terminal.

According to embodiments, the contact members are formed with a plurality of tongue shaped pieces punched from the conductor plate terminal. Each of the tongue shaped pieces includes a protruding part bent to protrude outward between a base part and a leading end of the tongue shaped piece. Shapes of the tongue shaped pieces are different from each other.

According to embodiment, the conductor plate terminal is located at a position of the electrode of the battery stored in the case and provided in an outer side of the case.

Protrusions corresponding to groove parts formed in the storage part of the electronic device are formed on the case at positions along side parts of the conductor plate terminal.

According to embodiments, a roof part extends toward an anode of the battery in a prescribed dimension from a position of the case where a cathode of the battery is to be located so as to cover the battery. A slit is formed in a base part of the roof part, and the conductor plate terminal is fixed to the slit.

According to embodiments, one of a rotation part and a rotation receiving part is formed in the case. The one of the rotation part and the rotation receiving part corresponds to the other of the rotation part and the rotation receiving part formed in a first side of an opening part of the storage part of the electronic device. The other mechanism of a fitting mechanism corresponding to one mechanism of the fitting mechanism formed in a second side opposed to the first side of the opening part is formed in the case.

According to embodiments, an electronic device includes a casing having a storage part provided with a power supply terminal for obtaining an electric power, and a battery holder to be stored in the storage part and to be integrated with the casing. The battery holder includes a case in which a battery is to be stored, and an electric connection part provided in the case. The electric connection part is electrically connected to an electrode of the stored battery and electrically connected to the power supply terminal, under a state that the battery holder is stored in the storage part of the electronic device.

According to embodiments, the battery holder includes the case in which the battery is stored and the electric connection part electrically connected to the electrode of the stored battery and connected to the power supply terminal under a state that the battery holder is stored in the storage part of the electronic device. Accordingly, since the electric connection part is provided in the case, it is unnecessary to provide a separate component in which an electrode for obtaining an electric connection with an external part is arranged. Thus, the battery holder has a simple structure and a low cost. The battery holder may be handled as a device separate from the electronic device.

In addition, the roof part of the prescribed dimension is formed in the direction of the anode of the battery so as to cover the battery from a position of the case where the cathode of the battery is to be located, so that the roof part prevents a breakage of the electric connection part due to an unexpected insertion of the battery and the stored battery from slipping out. Accordingly, when the battery is stored, a sufficient fixed state would be provided and the battery would be relatively easily removed and changed.

This application is based on Japanese Patent Application No. 2017-099087 filed on May 18, 2017, the entire content of which is incorporated herein by reference.

DESCRIPTION OF REFERENCE NUMERALS AND SIGNS 10 casing
11 storage part
12 receiving rib
13 power supply terminal
14 power supply terminal
15 groove part
20 battery holder
20a case
21 bottom plate
2a recessed part of first lane
22b recessed part of second lane
22c recessed part of third lane
23 electrode support wall
24 electrode support wall
25 electrode terminal
26A electrode holding piece
26B electrode holding piece
27 electrode terminal
28 roof part
29 slit
30a conductor plate terminal
30b conductor plate terminal

What is claimed is:

1. A battery holder configured to be stored in a storage part of an electronic device and to be integrated with a casing of the electronic device, the storage part including a power supply terminal for obtaining an electric power, the battery holder comprising:
    a case in which a plurality of batteries is to be stored;
    an electric connection part provided in the case, the electric connection part comprising a conductor plate terminal; and
    a roof part that extends from a position of the case where a cathode of a battery of the plurality of batteries is to be located toward a position of the case where an anode of the battery is to be located, the roof part having a predetermined length in a longitudinal direction such that, in a state where the battery is stored in the case, the roof part covers a cathode side of the battery and does not cover an anode side of the battery,
    wherein the conductor plate terminal includes a plurality of contact members,
    wherein the contact members are formed with a plurality of tongue shaped pieces punched from the conductor plate terminal,
    wherein each of the tongue shaped pieces includes a base part, a leading end, and a protruding part bent to protrude outward between the base part and leading end,
    wherein shapes of the tongue shaped pieces are different from each other, and
    wherein, in a state where the battery holder is stored in the storage part of the electronic device and the battery is stored in the case:
        the electric connection part is electrically connected to an electrode of the stored battery, and
        the protruding part of each tongue shaped piece is energized toward an outer side of the case so as to come into contact with the power supply terminal, such that the electric connection part is electrically connected to the power supply terminal.

2. The battery holder according to claim 1, wherein the conductor plate terminal is provided in an outer side of the case such that, in the state where the battery is stored in the case, the conductor plate terminal is located at a position of the electrode of the battery stored in the case, and wherein protrusions corresponding to groove parts formed in the storage part of the electronic device are formed on the case at positions along side parts of the conductor plate terminal.

3. The battery holder according to claim 1, wherein a slit is formed in a base part of the roof part, and the conductor plate terminal is fixed to the slit.

4. The battery holder according to claim 1, wherein one of a rotation part and a rotation receiving part is formed in the case, the rotation part corresponding to the rotation receiving part,
wherein the other of the rotation part and the rotation receiving part is formed in a first side of an opening part of the storage part of the electronic device,
wherein a first mechanism of a fitting mechanism is formed in the case, and a second mechanism of the fitting mechanism is formed in a second side of the opening part, the second side being opposed to the first side, and
wherein the first mechanism corresponds to the second mechanism.

5. The battery holder according to claim 1, wherein a support member which is configured to hold a battery set in the battery holder is provided on a bottom surface of the storage part.

6. The battery holder according to claim 1, further comprising:
an electrode terminal; and
a spring wire provided in the electrode terminal, the spring wire protruding slightly downward in the direction of the battery in the state where the battery is stored in the case;
wherein the roof part extends from the case past an end part of the spring wire.

7. The battery holder according to claim 1, wherein:
the protruding part of each tongue shaped piece is bent to define an edge along which the protruding part is bent, such that each tongue shaped piece has a distance from the base part of the tongue shaped piece to the edge of the tongue shaped piece, and
the protruding part of each tongue shaped piece is energized toward the outer side of the case at an angle,
wherein:
the respective distances of the respective tongue shaped pieces are different from each other, or
the respective angles of the respective tongue shaped pieces are different from each other.

8. An electronic device comprising:
a casing including a storage part provided with a power supply terminal for obtaining an electric power; and
a battery holder stored in the storage part and integrated with the casing,
wherein the battery holder includes:
a case in which a plurality of batteries is to be stored;
an electric connection part provided in the case; and
a roof part that extends from a position of the case where a cathode of a battery of the plurality of batteries is to be located toward a position of the case where an anode of the battery is to be located, the roof part having a predetermined length in a longitudinal direction such that, in a state where the battery is stored in the case, the roof part covers a cathode side of the battery and does not cover an anode side of the battery,
wherein, in the state where the battery is stored in the case, the electric connection part is electrically connected to an electrode of the stored battery and electrically connected to the power supply terminal,
wherein the electric connection part includes a conductor plate terminal,
wherein the conductor plate terminal includes a plurality of contact members,
wherein the plurality of contact members are energized toward an outer side of the case so as to come into contact with the power supply terminal,
wherein the contact members are formed with a plurality of tongue shaped pieces punched from the conductor plate terminal,
wherein each of the tongue shaped pieces includes a protruding part bent to protrude outward between a base part and a leading end of the tongue shaped piece, and
wherein shapes of the tongue shaped pieces are different from each other.

9. The electronic device according to claim 8, wherein the conductor plate terminal is provided in an outer side of the case such that, in the state where the battery is stored in the case, the conductor plate terminal is located at a position of the electrode of the battery stored in the case, and
wherein protrusions corresponding to groove parts formed in the storage part of the electronic device are formed on the case at positions along side parts of the conductor plate terminal.

10. The electronic device according to claim 8,
wherein a slit is formed in a base part of the roof part, and the conductor plate terminal is fixed to the slit.

11. The electronic device according to claim 8, wherein one of a rotation part and a rotation receiving part is formed in the case,
wherein the one of the rotation part and the rotation receiving part formed in the case corresponds to the other of the rotation part and the rotation receiving part formed in a first side of an opening part of the storage part of the electronic device,
wherein a first mechanism of a fitting mechanism is formed in the case, and a second mechanism of the fitting mechanism is formed in a second side of the opening part, the second side being opposed to the first side, and
wherein the first mechanism corresponds to the second mechanism.

12. The electronic device according to claim 8, wherein a support member which is configured to hold a battery set in the battery holder is provided on a bottom surface of the storage part.

13. A battery holder configured to be stored in a storage part of an electronic device and to be integrated with a casing of the electronic device, the storage part including a power supply terminal for obtaining an electric power, the battery holder comprising:
a case in which a plurality of batteries is to be stored; and
an electric connection part provided in the case, the electric connection part comprising a conductor plate terminal; and
a roof part that extends toward a position of the case where an anode of a battery of the plurality of batteries is to be located in a prescribed dimension from a position of the case where a cathode of the battery is to be located so as to cover the battery,
wherein the roof part has a predetermined length in a longitudinal direction such that, in a state where the battery is stored in the case, the roof part covers a cathode side of the battery and does not cover an anode side of the battery, wherein, in a state where battery holder is stored in the storage part of the electronic device and the battery is stored in the case, the electric connection part is electrically connected to an electrode of the stored battery and is electrically connected to the power supply terminal, and wherein the conductor plate terminal includes a plurality of contact members.

* * * * *